(12) United States Patent
Martz et al.

(10) Patent No.: US 11,746,716 B1
(45) Date of Patent: Sep. 5, 2023

(54) METHODS AND SYSTEMS FOR TURBINE OUTLET TEMPERATURE CONTROL

(71) Applicant: Ford Global Technologies, LLC, Dearborn, MI (US)

(72) Inventors: Jason Martz, Canton, MI (US); Waheed Alashe, Northville, MI (US); Eric Matthew Kurtz, Dearborn, MI (US); Paul Joseph Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/821,333

(22) Filed: Aug. 22, 2022

(51) Int. Cl.
*F02D 41/00* (2006.01)
*F02B 37/24* (2006.01)
*F02D 41/02* (2006.01)

(52) U.S. Cl.
CPC .......... *F02D 41/0007* (2013.01); *F02B 37/24* (2013.01); *F02D 41/0235* (2013.01); *F02D 2041/0022* (2013.01); *F02D 2041/0265* (2013.01); *F02D 2200/0802* (2013.01); *F02D 2200/101* (2013.01)

(58) Field of Classification Search
CPC .......... F02B 37/24; F02D 41/0235; F02D 2041/0022; F02D 2041/0265; F02D 2200/0802; F02D 2200/101
See application file for complete search history.

(56) References Cited

U.S. PATENT DOCUMENTS

| | | | | |
|---|---|---|---|---|
| 5,622,049 A | * | 4/1997 | Kitamura | F01N 9/005 60/285 |
| 2008/0190107 A1 | * | 8/2008 | Ogiso | F02D 41/1445 60/284 |
| 2011/0107739 A1 | * | 5/2011 | Shimizu | F02D 41/0007 60/273 |
| 2014/0325962 A1 | | 11/2014 | Nagaoka et al. | |
| 2017/0051684 A1 | | 2/2017 | Lahti et al. | |
| 2017/0122234 A1 | * | 5/2017 | Kuechler | F02D 41/005 |
| 2021/0164409 A1 | | 6/2021 | Tanis et al. | |

FOREIGN PATENT DOCUMENTS

| | | |
|---|---|---|
| CN | 112855369 A | 5/2021 |
| JP | 2008106629 A | 5/2008 |

* cited by examiner

*Primary Examiner* — Mickey H France
(74) *Attorney, Agent, or Firm* — Vincent Mastrogiacomo; McCoy Russell LLP

(57) ABSTRACT

Methods and systems are provided for controlling a catalyst temperature. In one example, a method includes throttling in response to the catalyst temperature exceeding a threshold temperature. The throttling includes adjusting an intake throttle position to a more closed position. The throttling further includes increasing a turbine work extraction via adjusting a position of a plurality of turbine vanes to decrease a turbine outlet temperature.

12 Claims, 5 Drawing Sheets

METHODS AND SYSTEMS FOR TURBINE OUTLET TEMPERATURE CONTROL

FIELD

The present description relates generally to controlling the turbine outlet temperature via intake throttling.

BACKGROUND/SUMMARY

Catalysts arranged in vehicles may operate within a desired temperature range. Catalyst temperatures below the desired temperature range may not treat emissions at a desired rate. Catalyst temperature above the desired temperature range may lead to advanced catalyst ageing, decreasing the longevity of the catalyst.

For example, particulate filters may experience runaway regenerations where particulates thereon burned at an uncontrolled rate, which may lead to leaks and other degradations. As another example, selective catalytic reduction (SCR) devices may experience losses in NO conversion efficiency when exposed to temperatures higher than the desired temperature range.

Some example approaches for controlling catalyst temperatures include diluting the exhaust gas with a lower temperature substance (e.g., a water injection) or arranging a heat exchanger upstream of the catalyst. However, these solutions present packaging issues as they add additional volume to a constrained space. Furthermore, heat rejection rates to the coolant may increase, which may limit overall engine power.

Other example approaches may include extracting work from the exhaust gas via an electric turbocharger or a non-electric turbocharger. These systems may present an increased cost to the manufacturer due to the complexity of the turbocharger configuration along with changes to other vehicle system components. Derates may be executed to reduce a peak engine power to limit the catalyst temperature. However, this may reduce customer satisfaction. Thus, a packaging conscious and cost-effective method for controlling turbine outlet temperature is desired to enhance catalyst durability and functionality.

In one example, the issues described above may be addressed by a method for adjusting a position of an intake throttle when an engine is combusting fuel in response to a temperature of a catalyst exceeding a threshold catalyst temperature. In this way, the temperature of the catalyst is controlled via actuation of the throttle and not by derating the engine or additional heat exchangers.

As one example, the engine includes a turbocharger comprising a compressor and a turbine. The turbine may be a variable geometry turbine including a plurality of adjustable vanes that may change the pressure of gas flowing toward a turbine blade. When throttling occurs and the intake throttle is adjusted to a more closed position, the plurality of vanes may be adjusted to a more closed position to maintain a current engine power output. By doing this, heat extraction from the exhaust gas via the turbine may increase, which may result in a lower turbine outlet temperature and therefore a lower catalyst temperature.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
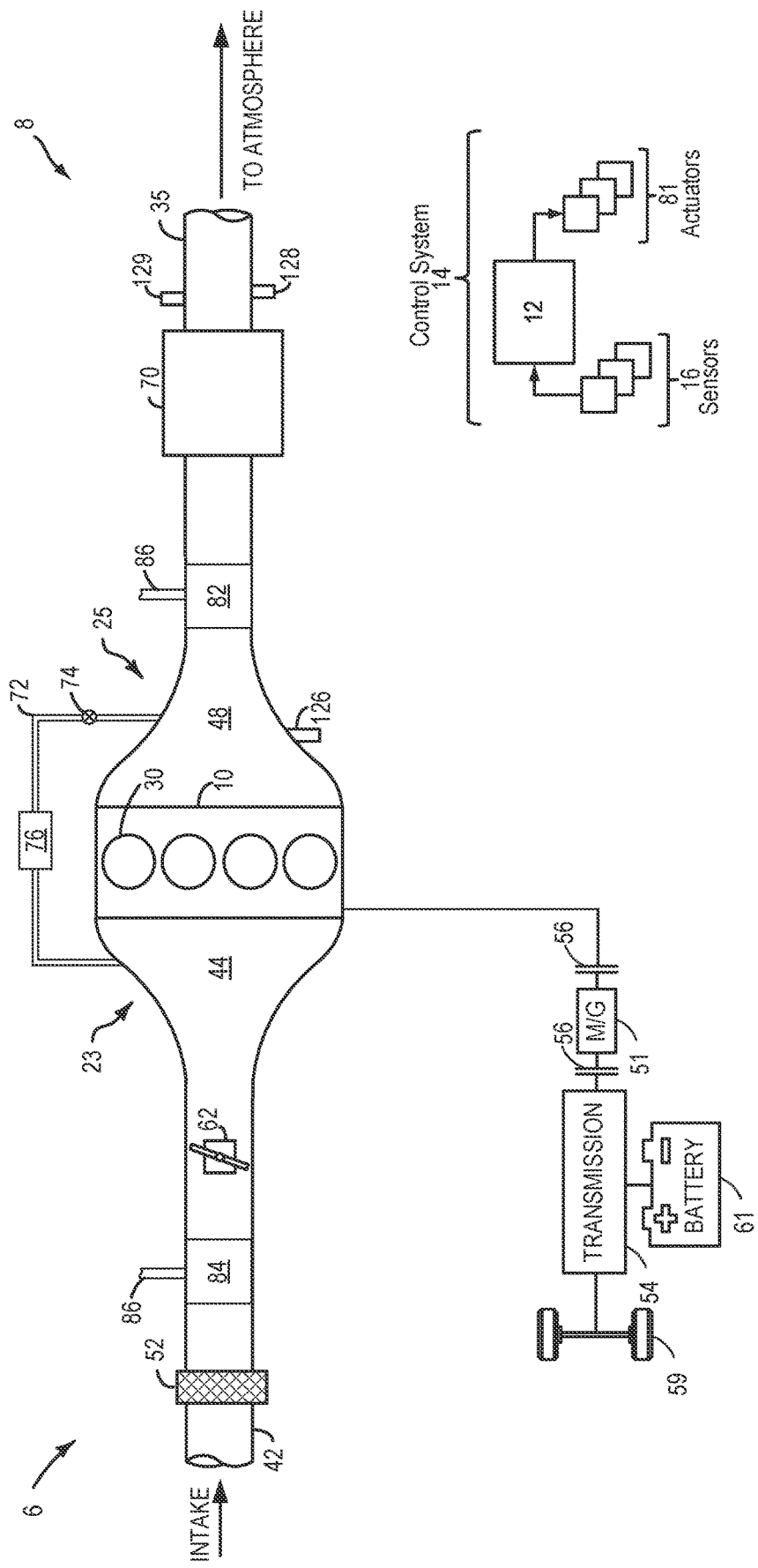
FIG. 1 illustrates a schematic of an engine included in a hybrid vehicle
Figure 2:
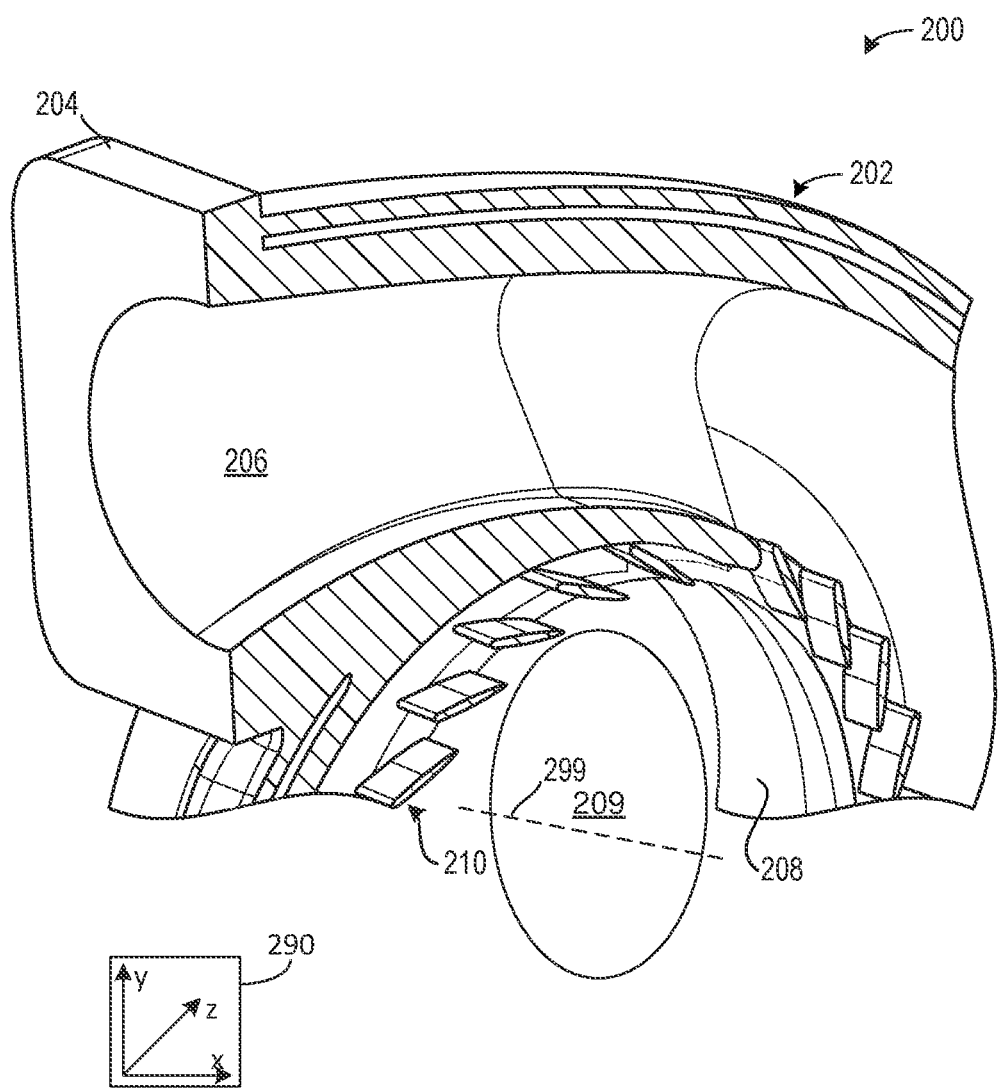
FIG. 2 illustrates a schematic of a variable geometry turbine (VGT).
Figure 4:
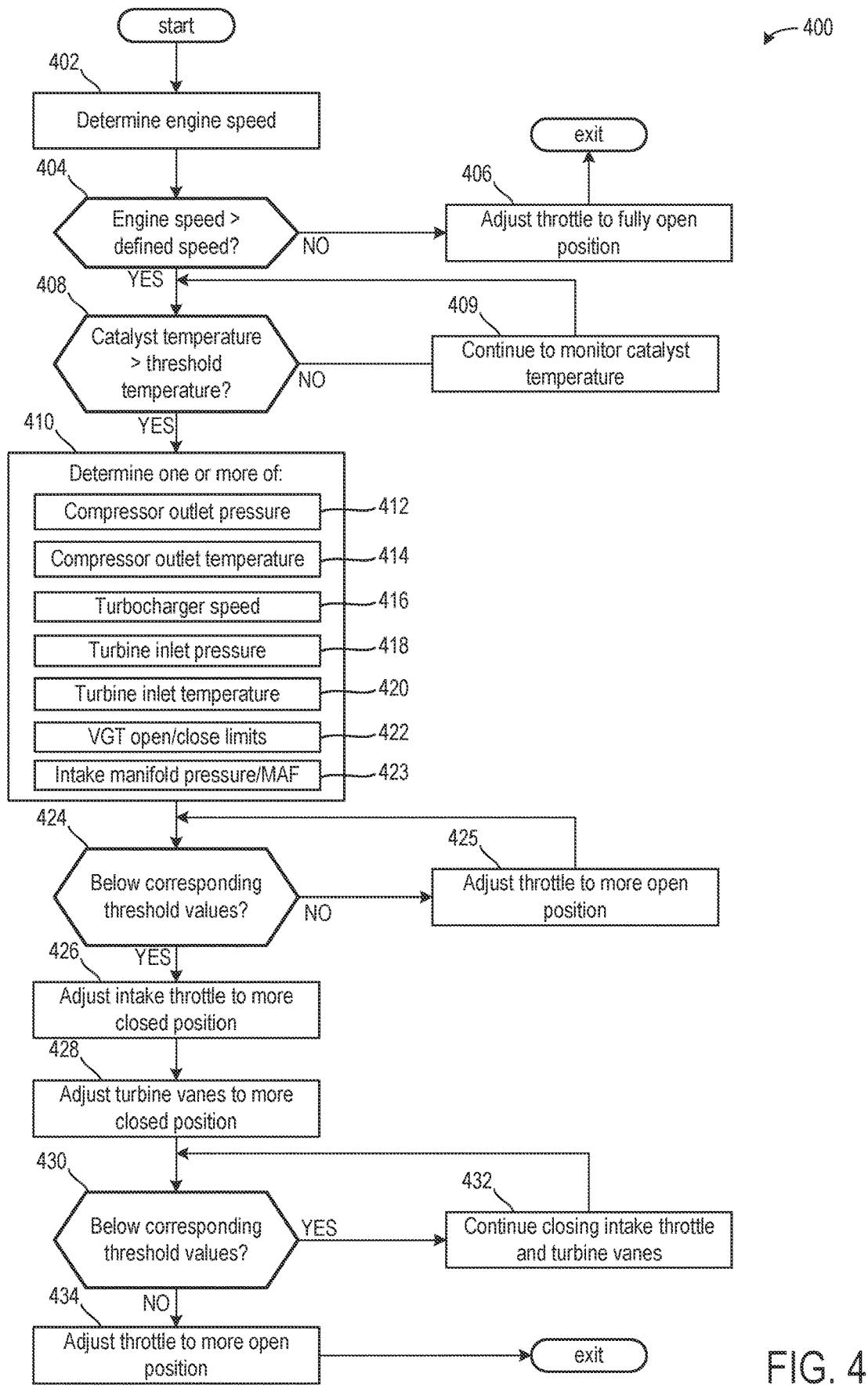
FIG. 4 illustrates a method for adjusting an intake throttle and VGT position in response to the catalyst temperature and turbocharger conditions.
Figure 5:
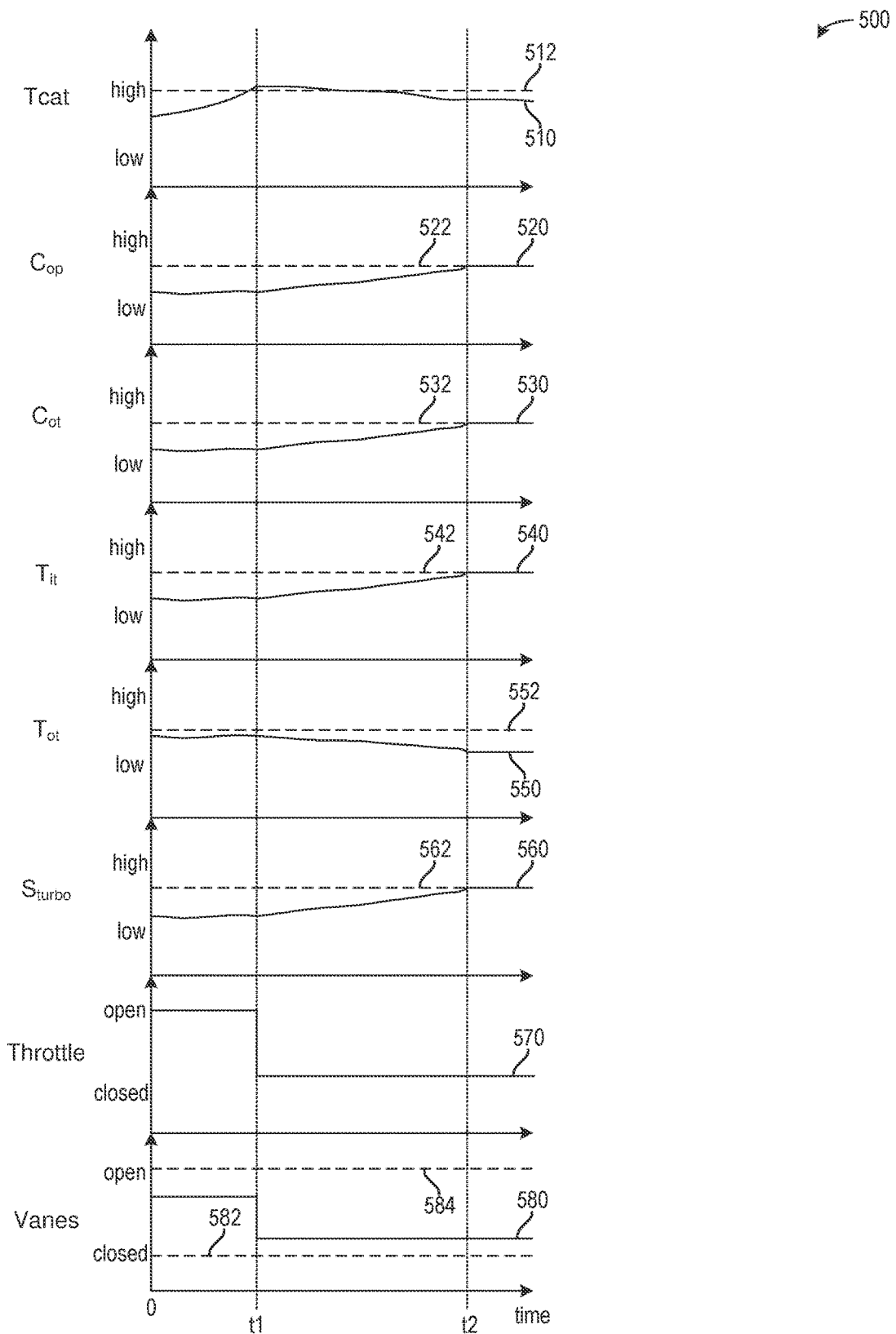
FIG. 5 illustrates an engine operating sequence illustrating changes to throttle and turbocharger conditions in response to the catalyst temperature.

The following description relates to systems and methods for controlling a catalyst temperature via intake throttling. The throttle may be arranged downstream of a compressor and upstream of an intake manifold coupled to an engine, as shown in FIG. 1. The compressor may be mechanically coupled to a variable geometry turbine comprising a plurality of adjustable vanes. The turbine is illustrated in FIG. 2. A high level flow chart shown in FIG. 3 describes a method for adjusting the throttle in response a catalyst temperature. A method for adjusting the throttle position and the position of the vanes in response to the catalyst temperature, engine speed, and turbocharger conditions is shown in FIG. 4. FIG. 5 illustrates an engine operating sequence illustrating changes to throttle and turbocharger conditions in response to the catalyst temperature.

In one example, methods and systems provide support for decreasing a turbine outlet temperature in response to a temperature of a catalyst being greater than or equal to a threshold temperature. The turbine outlet temperature may be reduced via throttling in combination with adjusting vanes of the turbine to a more closed position. An amount of throttling and vane closure may be based on an engine speed and turbocharger conditions.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Each cylinder of the plurality of cylinders 30 may include at least one injector positioned to provide fuel thereto. The fuel is diesel in one example. Other fuels, such as gasoline and alcohols, may be used. Engine 10 includes an engine intake 23 and an engine exhaust 25. Engine intake 23 includes an air intake throttle 62 fluidly coupled to the engine intake manifold 44 via an intake passage 42. As shown, the throttle 62 is downstream a compressor 84 and there are no intervening components arranged between the throttle 62 and the engine intake manifold 44. Air may enter intake passage 42 via air filter 52. Engine exhaust 25 includes an exhaust manifold 48 leading to an exhaust passage 35 that routes exhaust gas to the atmosphere. Engine exhaust 25 may include an emission control device 70 mounted in a close-coupled position or in a far underbody position. The emission control device 70 may be one of a plurality of emissions control devices including a three-way catalyst, lean NOx trap, diesel particulate filter, oxidation catalyst, selective catalytic reduction (SCR) device, etc. It will be appreciated that other components may be included in the engine such as a variety of valves and sensors, as further elaborated in herein.

The engine system 8 may further include a boosting device, such as a turbocharger comprising a turbine 82 and the compressor 84. The turbine 82 and the compressor 84 may be rotatably coupled to one another via a shaft 86. The turbine 82 may rotate via an exhaust gas flow, wherein rotation of the turbine 82 may translate into rotation of the compressor 84 via the shaft 86.

The turbine 82 may include a plurality of vanes (illustrated in FIG. 2). The plurality of vanes may be actuated to adjust a flowrate of gases flowing to a turbine rotor. In one example, the emission control device 70 may be cooled via a combination of throttling the intake throttle 62 and adjusting the plurality of vanes to a more closed position. Cooling may be requested based on a temperature of the emission control device 70, which may be determined via feedback from a temperature sensor 128. There are no intervening components, such as an injector, a passage, or a heat exchanger, arranged between the turbine 82 and the emission control device 70.

Herein, actuation of a valve, the vanes, or other device to a more closed position or a more open position is in relation to a previous position of the valve prior to its actuation. The more closed position may include allowing less fluid to flow through the valve relative to its previous position. The more open position may allow more fluid to flow through the valve relative to its previous position. Thus, throttling of the intake throttle, as described with respect to method 300 and 400 of FIGS. 3 and 4, respectively, including adjusting the intake throttle to a more closed position relative to a previous position such that a restriction of the intake throttle is increased and less air flows therethrough. The intake throttle may be adjusted to a fully open position, a fully closed position, and any position therebetween. The fully open position may include a smallest restriction and allow a maximum amount of airflow therethrough and the fully closed position may include a largest restriction and allow a minimum amount of airflow therethrough.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2, it shows a first embodiment 200 of a turbine 202. The turbine may be used similarly to turbine 82 in the turbocharger arrangement of FIG. 1. An axis system 290 is shown comprising three axes, namely an x-axis parallel to a horizontal direction, a y-axis parallel to a vertical direction, and a z-axis perpendicular to each of the x- and y-axes. The axes may be used in reference to describe shapes and orientations of components of the turbine.

The turbine comprises a turbine housing 204 which may shape an exhaust gas inlet 206. The exhaust gas inlet 206 may comprise a volute shape adapted to receive exhaust gas from an engine, such as engine 10 of FIG. 1. The volute shape of the exhaust gas inlet 206 may distribute the exhaust gas around in a 360-degree manner to a turbine wheel (circle 209 indicates where a turbine wheel may be positioned within the turbine). The exhaust gas may rotate the turbine wheel 209, which may translate into rotation of a compressor wheel in a manner known to those of ordinary skill in the art.

The turbine 202 may further comprise a plurality of vanes 210 arranged adjacent to and surrounding the turbine wheel 209, around an entire circumference of the turbine wheel, along a nozzle ring 208. Together, the nozzle ring 208 and plurality of vanes 210 may form a nozzle of the turbine (e.g., turbine nozzle), adapted to guide exhaust flow to the turbine wheel. The plurality of vanes 210 may be printed onto the nozzle ring in some examples. Additionally or alternatively, the plurality of vanes 210 may be assembled from a mold. The plurality of vanes 210 inside the turbine may be actuated mechanically, hydraulically, pneumatically, and so on. The controller (e.g., controller 12 of FIG. 1) may signal to actuators of the plurality of vanes 210 to adjust each of the vanes to a more open position or a more closed position.

The plurality of vanes may be arranged around an entire circumference of the nozzle ring, between the turbine wheel and the exhaust gas inlet. The plurality of vanes may be shaped to adjust a geometry of the turbine based on one or more engine conditions, such as an engine power level, the turbo speed, a manifold pressure, an exhaust temperature, and a catalyst temperature. The plurality of vanes 210 may be configured to adjust a nozzle area of the turbine, which may modify a speed of exhaust gases flowing therethrough. In some examples, it may be desired to reduce the speed of exhaust gases to the turbine via the plurality of vanes to decrease the turbo speed. In one example, the plurality of vanes may be used in combination with the wastegate. Alternatively, the wastegate may be omitted and the plurality of vanes may be the only element configured to adjust exhaust gas flow to the turbine. In one example, by at least partially closing the plurality of vanes, gases flowing therethrough may be accelerated while an exhaust gas mass flow rate through the turbine is reduced. As such, the turbine speed and expansion ratio may increase. Compressor outlet pressure and mass flow increase, while specific work extraction of the turbine increases, thereby decreasing an exhaust gas temperature and a turbine outlet temperature relative to a previous position of the vanes. By doing this, an engine power output may be maintained and catalyst temperatures may be reduced as will be described herein.

Figure 3:
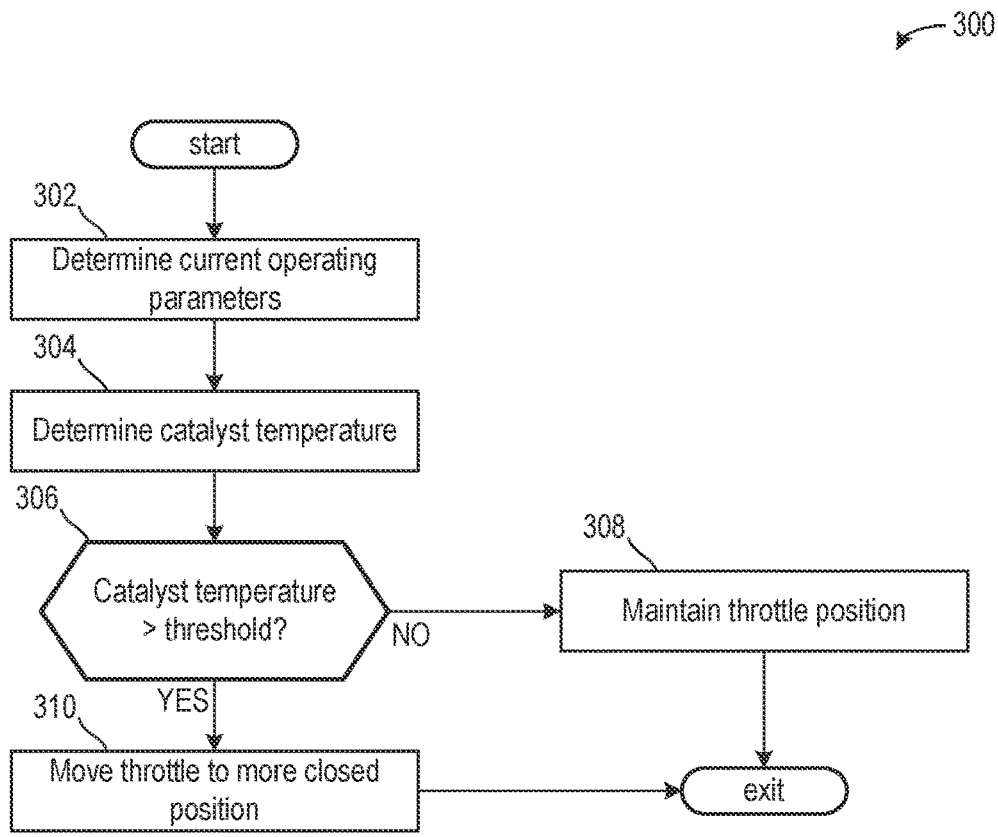
FIG. 3 illustrates a high-level flow chart for controlling a catalyst temperature.

Turning now to FIG. 3, it shows a high level flow chart illustrating a method 300 for adjusting a throttle position in response to a catalyst temperature. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining current operating parameters. Current operating parameters may include, but are not limited to, one or more of a throttle position, a manifold pressure, an engine speed, an engine temperature, a vehicle speed, and an air/fuel ratio.

At 304, the method 300 may include determining a catalyst temperature. The catalyst temperature may be determined based on feedback from a catalyst temperature sensor positioned upstream of, downstream of (e.g., temperature sensor 128 of FIG. 1), or integrated into a catalyst bed of the catalyst. The catalyst temperature sensor may provide feedback to the controller regarding an exhaust gas temperature when position outside of (e.g., upstream or downstream of) the catalyst, which may be extrapolated to a catalyst temperature. Additionally or alternatively, the catalyst temperature integrated into the catalyst structure may directly provide feedback regarding the catalyst temperature.

At 306, the method 300 may include determining if a catalyst temperature is greater than a threshold temperature. In one example, the catalyst temperature is compared to the threshold temperature during engine combustion conditions where the engine is being fueled and outside of a cold-start. The threshold temperature may be based on an upper temperature of an operating temperature range of the catalyst. In one example, the threshold temperature is greater than a light-off temperature of the catalyst, wherein the light-off temperature is based on a lower temperature of the operating temperature range of the catalyst. The upper temperature may represent a highest temperature at which the catalyst may treat emissions at a desired conversion rate. Catalyst temperatures above the threshold temperature may reduce an efficiency of the catalyst. Additionally or alternatively, catalyst temperatures above the threshold temperature may result in catalyst degradation, such as a leak forming.

If the catalyst temperature is not greater than the threshold temperature (e.g., less than or equal to), then throttling may not be desired and at 308, the method 300 may include maintaining a current throttle position. As such, the throttle is not moved to a more closed position in response to the catalyst temperature.

If the catalyst temperature is greater than the threshold temperature, then at 310, the method 300 may include moving the throttle to a more closed position. Actuation of the throttle may include signaling to an actuator of the throttle to move to a more closed position. The more closed position may increase a pressure downstream of the throttle. Method 400 describes the actuation of the throttle based on turbocharger conditions, the catalyst temperature, and a position of turbine vanes.

Turning now to FIG. 4, it shows the method 400 for adjusting an opening of a throttle based on turbocharger and catalyst conditions. The method 400 begins at 402, which includes determining an engine speed. The engine speed may be determined based on feedback from a crankshaft measuring a rotation speed of a crankshaft, which may be proportional to an engine speed.

At 404, the method 400 may include determining if the engine speed is greater than a defined speed. In one example, the defined speed may correspond to an engine speed during a high load. In one embodiment, additionally or alternatively, the defined speed is equal to 2,000 rotations per minute (RPM). Additionally or alternatively, the defined speed is equal to 2,500 RPM.

If the engine speed is not greater than the defined speed, then at 406, the method 400 may include adjusting the throttle to a fully open position. In some examples, the throttle may already be in the fully open position, in which case, the method 400 may include maintaining the throttle in the fully open position. As such, intake throttling (e.g., adjusting the intake throttle to a more closed position) to control a catalyst temperature may not occur. Throttling may include restricting airflow via the throttle to the manifold.

If the engine speed is greater than the defined speed, then at 408, the method 400 may include determining if the catalyst temperature is greater than the threshold temperature, similar to 306 of method 300 of FIG. 3.

If the catalyst temperature is not greater than the threshold temperature, then the method 400 may include continuing to monitor the catalyst temperature at 409.

If the catalyst temperature is greater than the threshold temperature, then catalyst cooling may be desired via reduction of a turbine outlet temperature and the method 400 proceeds to 410. In one example, adjusting the throttle to a more closed position may be combined with adjusting vanes of the turbine to a more closed position. The boost pressure is thus maintained to maintain comparable intake air and exhaust gas mass flow rates compared to the throttle being in the more open position, resulting in an engine output power being maintained while the catalyst temperature is reduced. The increase in the compressor outlet pressure due to throttling may result in an increase in compressor work, and therefore turbine work. While pumping work and a turbine inlet temperature may increase with throttling, a turbine outlet temperature may be reduced relative to prior to throttling due to the increase work extraction from the exhaust by the turbine.

At 410, the method 400 may include determining one or more of a compressor outlet pressure 412, a compressor outlet temperature 414, a turbocharger speed 416, a turbine inlet pressure 418, a turbine inlet temperature 420, a VGT open/close limit 422, and an intake manifold pressure/air mass flow rate 423. In one example, previously listed conditions may dictate a magnitude to which throttling may occur via providing an indication of turbocharger speed. For example, if the vanes are currently in a more closed position, then an adjustment of the vanes to be further closed to maintain current compressor outlet pressures may be limited. As such, the amount a throttle may be closed may be based at least in part on the determined conditions. In one example, an amount of throttling may be reduced in response to the compressor outlet pressure increasing, the compressor outlet temperature increasing, the turbocharger speed increasing, the turbine inlet pressure increasing, the turbine inlet temperature increasing, and the VGT approaching an open/close limit.

At 424, the method 400 may include determining if current values are below corresponding threshold values (e.g., values determined at operation 410). The compressor outlet pressure is compared to a threshold compressor outlet pressure, the compressor outlet temperature is compared to a threshold compressor outlet temperature, the turbocharger speed is compared to a threshold turbocharger speed, the turbine inlet pressure is compared to a threshold turbine inlet pressure, the turbine inlet temperature is compared to a threshold turbine inlet temperature, and a current VGT position is compared to a threshold VGT open/close limit.

Each of the threshold values may be based on operating limits of the turbocharger. For example, values above the threshold compressor outlet pressure and temperature may result in degradation of the compressor, which may include compressor surge, a leak developing, a crack, or other undesired event. Speeds above the threshold turbocharger speed may result in turbocharger runaway, which may lead to lubricant and/or coolant leaking from the turbocharger. The threshold VGT open/close limit may be based on a range in which vanes of the VGT may be actuated during a current operating condition or during all conditions.

If at least one of the conditions is greater than or equal to a corresponding threshold, then at 425, the method 400 may include adjusting the throttle to a more open position. The conditions may be returned to values below corresponding threshold values.

If the values are below threshold values such that the turbine and compressor can tolerate increased inlet temperatures and pressures, and if turbocharger runaway is unlikely based on the turbocharger speed being less than the threshold turbocharger speed, then at 426, the method 400 may include adjusting an intake throttle to a more closed position. As such, throttling may be initiated. For example, the intake throttle position may be closed-loop controlled to a desired compressor outlet pressure setpoint. If the compressor outlet pressure is above the setpoint, then the intake throttle may be moved to a more open position.

At 428, the method 400 may include adjusting the turbine vanes to a more closed position. By doing this, intake manifold pressure and intake and exhaust gas mass flow rates may be similar to values prior to the throttling. In this way, the engine power output is not reduced while the intake throttle is closed. The turbine may extract a greater amount of heat from the exhaust gases due to its increased work output, resulting in a lower turbine outlet temperature. For example, the turbine vanes may be closed loop controlled to a desired intake manifold pressure setpoint. If the intake manifold pressure is above the desired setpoint, then the turbine vanes may be moved to a more open position.

At 430, the method 400 may include determining if the current values are still below corresponding threshold values. If the current values are still below corresponding threshold values, then at 432, the method 400 may include further closing the intake throttle and the turbine vanes. As such, the catalyst temperature may be further reduced via the turbine extracting more work from the exhaust gas. In one example, the throttling may be executed in a stepwise manner, wherein adjustments in the throttle and vane positions are executed and turbocharger conditions are monitored to determine if further throttling may be executed.

If the current values are no longer below corresponding threshold values, then at 434, the method 400 may include maintaining adjusting the throttle to a more open position. The conditions may be returned to values below corresponding threshold values.

In one example, the method may include actuating the intake throttle and vanes stepwise, wherein conditions are monitored following each actuation. If one or more conditions exceed a corresponding threshold, then the method may include reverting to a previous actuation position, more open than a current actuation position. By doing this, the turbine outlet temperature may still decrease relative to a fully open position of the intake throttle and turbine vanes.

Turning now to FIG. 5, it shows a graph 500 graphically illustrating changes to operating parameters in response to turbocharger conditions and a catalyst temperature. Plot 510 illustrates a catalyst temperature and dashed line 512 illustrates a threshold catalyst temperature. Plot 520 illustrates a compressor outlet pressure and dashed line 522 illustrates a threshold compressor outlet pressure. Plot 530 illustrates a compressor outlet temperature and dashed line 532 illustrates a threshold compressor outlet temperature. Plot 540 illustrates a turbine inlet temperature and dashed line 542 illustrates a threshold turbine inlet temperature. Plot 550 illustrates a turbine outlet temperature and dashed line 552 illustrates a threshold turbine outlet temperature. Plot 560 illustrates a turbocharger speed and dashed line 562 illustrates a threshold turbocharger speed. Plot 570 illustrates an intake throttle position. Plot 580 illustrates a position of a plurality of turbine vanes, dashed line 582 illustrates a closed limit of the plurality of turbine vanes, and dashed line 584 illustrates an open limit of the plurality of turbine vanes. Time increases from a left to a right side of the figure.

Prior to t1, the catalyst temperature increases above the threshold catalyst temperature. At t1, the intake throttle is moved to a more closed position. Likewise, the plurality of turbine vanes is moved to a more closed position. In one example, the positions of the throttle and the plurality of vanes may be initially adjusted based on a difference between the catalyst temperature and the threshold catalyst temperature. For example, as the difference increases, an amount of closing of the throttle and the plurality of vanes may be increased.

Between t1 and t2, the compressor outlet pressure, the compressor outlet temperature, the turbine inlet temperature, and the turbocharger speed approach corresponding thresholds. The turbine outlet temperature decreases away from the threshold turbine outlet temperature, thereby indicating a temperature of exhaust gases flowing from the turbine is lower compared to temperatures prior to the throttling (e.g., prior to t1). As a result, the catalyst temperature decreases below the threshold catalyst temperature.

At t2, the compressor outlet pressure, the compressor outlet pressure, the compressor outlet temperature, the turbine inlet temperature, and the turbocharger speed reach corresponding thresholds. As such, after t2, the intake throttle position is maintained and the position of the plurality of turbine vanes is maintained. The catalyst temperature remains below the threshold catalyst temperature.

In this way, intake throttling may be used to reduce a catalyst temperature. Vanes of the turbine may be adjusted to maintain a current engine power output, which in turn may increase a turbine work rate and decrease a turbine outlet temperature. By doing this, a packaging size and complexity of the turbocharger may be reduced while still controlling the catalyst temperature.

The disclosure provides support for a method including adjusting a position of an intake throttle when an engine is combusting fuel in response to a temperature of a catalyst exceeding a threshold catalyst temperature. A first example of the method further includes adjusting a position of a plurality of vanes arranged in a turbine of a turbocharger. A second example of the method, optionally including the first example, further includes where the intake throttle is positioned between a compressor and an intake manifold coupled to the engine. A third example of the method, optionally including one or more of the first and second examples, further includes where adjusting the position of the intake throttle further comprises closing the intake throttle. A fourth example of the method, optionally including one or more of the first through third examples, further includes where the catalyst is arranged downstream of a turbine, wherein the turbine is a variable geometry turbine comprising a plurality of vanes. A fifth example of the method, optionally including one or more of the first through fourth examples, further includes where the adjusting occurs during a high engine load comprising an engine speed greater than a threshold engine speed.

The disclosure further provides support for a system including an engine, a turbocharger comprising a compressor coupled to a variable geometry turbine (VGT), an intake throttle arranged between the compressor and an intake manifold coupled to the engine, a catalyst arranged downstream of the VGT, and a controller comprising computer-readable instructions on memory thereof that when executed cause the controller to adjust a position of the intake throttle in response to a temperature of the catalyst being greater than or equal to a threshold temperature, and adjust a position of a plurality of vanes of the VGT. A first example of the system further includes where the engine is a diesel engine and is combusting diesel when the position of the throttle is adjusted, the position of the intake throttle is adjusted to a more closed position relative to a previous position of the intake throttle, wherein instructions further enable the controller to actuate the intake throttle to a fully open position when the temperature of the catalyst is less than the threshold temperature. A second example of the system, optionally including the first example, further includes where the position of the plurality of vanes is adjusted to a more closed position relative to a previous position of the plurality of vanes, and wherein the VGT is upstream of the catalyst with no intervening components arranged therebetween. A third example of the system, optionally including one or more of the first and second examples, further includes where the instructions further enable the controller to maintain the position of the intake throttle in response to one of the temperature of the catalyst being less than the threshold temperature. A fourth example of the system, optionally including one or more of the first through third examples, further includes where the instructions further enable the controller to maintain the position of the intake throttle in response to a compressor outlet temperature being greater than a threshold compressor outlet temperature or a compressor outlet pressure being greater than a threshold compressor outlet pressure. A fifth example of the system, optionally including one or more of the first through fourth examples, further includes where the instructions further enable the controller to maintain the position of the intake throttle in response to the turbocharger speed being greater than a threshold turbocharger speed. A sixth example of the system, optionally including one or more of the first through fifth examples, further includes where the instructions further enable the controller to maintain the position of the intake throttle in response to the turbine inlet pressure being greater than a threshold turbine inlet pressure, or a turbine inlet temperature being greater than a threshold turbine inlet temperature. A seventh example of the system, optionally including one or more of the first through sixth examples, further includes where the instructions further enable the controller to maintain the position of the intake throttle in response to the position of the plurality of vanes being outside a closed limit or an open limit. An eighth example of the system, optionally including one or more of the first through seventh examples, further includes where the instructions further enable the controller to adjust the position of the throttle in response to the temperature of the catalyst being greater than or equal to the threshold temperature when an engine speed is greater than a threshold engine speed.

The disclosure further provides support for a method including decreasing a temperature of a catalyst during a high engine load via decreasing an outlet temperature of a turbine. A first example of the method further includes increasing one or more of a compressor outlet pressure, a compressor outlet temperature, a turbocharger speed, a turbine inlet pressure, a turbine inlet temperature, an intake manifold pressure, and an intake air mass flow rate. A second example of the method, optionally including the first example, further includes decreasing the temperature of the catalyst further comprises closing an intake throttle and closing vanes arranged in the turbine. A third example of the method, optionally including one or more of the first and second examples, further includes fueling an engine and maintaining a power output of the engine. A fourth example of the method, optionally including one or more of the first through third examples, further includes where the temperature of the catalyst is greater than a threshold temperature, the threshold temperature greater than a light-off temperature of the catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a condition that comprises combusting fuel via an engine and operating the engine at a high engine load, the high engine load comprising an engine speed greater than a threshold engine speed,
adjusting a position of an intake throttle to a more closed position in response to a temperature of a catalyst exceeding a threshold catalyst temperature; and
adjusting a position of a plurality of vanes of a turbine to a more closed position.

2. The method of claim 1, wherein the intake throttle is positioned between a compressor and an intake manifold coupled to the engine.

3. The method of claim 1, wherein adjusting the position of the intake throttle comprises closing the intake throttle.

4. The method of claim 1, wherein the catalyst is arranged downstream of the turbine, wherein the turbine is a variable geometry turbine (VGT) comprising the plurality of vanes.

5. A system, comprising:
an engine;
a turbocharger comprising a compressor coupled to a variable geometry turbine (VGT);
an intake throttle arranged between the compressor and an intake manifold coupled to the engine;
a catalyst arranged downstream of the VGT; and
a controller comprising computer-readable instructions on memory thereof that when executed cause the controller to:
during a first condition,
adjust a position of the intake throttle from an initial position to a more closed position in response to a temperature of the catalyst being greater than or equal to a threshold temperature; and
adjust a position of a plurality of vanes of the VGT to a more closed position,
wherein the first condition includes combusting fuel via the engine and operating the engine at a high engine load, the high engine load comprising an engine speed greater than a threshold engine speed.

6. The system of claim 5, wherein the engine is a diesel engine and is combusting diesel when the position of the intake throttle is adjusted, wherein instructions further enable the controller to actuate the intake throttle to a fully open position when the temperature of the catalyst is less than the threshold temperature.

7. The system of claim 5, wherein the more closed position of the plurality of vanes is more closed relative to a previous position of the plurality of vanes, and wherein the VGT is upstream of the catalyst with no intervening components arranged therebetween.

8. The system of claim 5, wherein the instructions further enable the controller to, during the first condition, maintain the position of the intake throttle at the initial position in response to the temperature of the catalyst being less than the threshold temperature.

9. The system of claim 5, wherein the instructions further enable the controller to, during a second condition, adjust the position of the intake throttle to a more open position responsive to a compressor outlet temperature being greater than a threshold compressor outlet temperature or a compressor outlet pressure being greater than a threshold compressor outlet pressure.

10. The system of claim 5, wherein the instructions further enable the controller to, during a second condition, adjust the position of the intake throttle to a more open position in response to a speed of the turbocharger being greater than a threshold turbocharger speed.

11. The system of claim 5, wherein the instructions further enable the controller to, during a second condition, adjust the position of the intake throttle to a more open position in response to a turbine inlet pressure being greater than a threshold turbine inlet pressure, or a turbine inlet temperature being greater than a threshold turbine inlet temperature.

12. The system of claim 5, wherein the instructions further enable the controller to, during a second condition, adjust the position of the intake throttle to a more open position in response to the position of the plurality of vanes being outside a closed limit or an open limit.

* * * * *